(12) United States Patent
Backhaus et al.

(10) Patent No.: US 7,908,856 B2
(45) Date of Patent: Mar. 22, 2011

(54) IN-LINE STIRLING ENERGY SYSTEM

(75) Inventors: Scott N. Backhaus, Espanola, NM (US); Robert Keolian, State College, PA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 62 days.

(21) Appl. No.: 11/877,816

(22) Filed: Oct. 24, 2007

(65) Prior Publication Data
US 2009/0107138 A1   Apr. 30, 2009

(51) Int. Cl.
*F01B 29/10* (2006.01)
*F02G 1/04* (2006.01)
*F25B 9/00* (2006.01)
*H02N 10/00* (2006.01)
*H02N 2/00* (2006.01)
*H01L 41/00* (2006.01)

(52) U.S. Cl. .............. 60/517; 60/516; 62/6; 310/306; 310/311

(58) Field of Classification Search ............ 60/516–526; 310/311–371
See application file for complete search history.

(56) References Cited

U.S. PATENT DOCUMENTS

| | | | | |
|---|---|---|---|---|
| 4,087,714 A | * | 5/1978 | La Rosa et al. | 310/313 B |
| 4,114,380 A | * | 9/1978 | Ceperley | 60/721 |
| 4,398,398 A | * | 8/1983 | Wheatley et al. | 62/467 |
| 4,442,372 A | * | 4/1984 | Roberts | 310/339 |
| 4,723,411 A | | 2/1988 | Darooka et al. | |
| 4,786,836 A | * | 11/1988 | Tokushima | 310/323.07 |
| 5,813,234 A | * | 9/1998 | Wighard | 62/6 |
| 5,857,340 A | * | 1/1999 | Garrett | 62/6 |
| 6,032,464 A | | 3/2000 | Swift et al. | |
| 6,314,740 B1 | * | 11/2001 | De Blok et al. | 62/6 |
| 6,658,862 B2 | | 12/2003 | Swift et al. | |
| 6,732,515 B1 | * | 5/2004 | Weiland et al. | 60/520 |
| 6,868,673 B2 | * | 3/2005 | Weiland et al. | 60/698 |
| 7,081,699 B2 | * | 7/2006 | Keolian et al. | 310/311 |
| 7,134,279 B2 | | 11/2006 | White et al. | |
| 7,628,022 B2 | | 12/2009 | Spoor et al. | |
| 2005/0016171 A1 | | 1/2005 | Fellows | |
| 2005/0093398 A1 | | 5/2005 | Kim et al. | |
| 2007/0090723 A1 | | 4/2007 | Keolian et al. | |

OTHER PUBLICATIONS

International Search Report written by searching authority mailed Jan. 8, 2009.

* cited by examiner

*Primary Examiner* — Thomas E Denion
*Assistant Examiner* — Christopher Jetton
(74) *Attorney, Agent, or Firm* — Husch Blackwell LLP; Meredith H. Schoenfeld

(57) ABSTRACT

A high efficiency generator is provided using a Stirling engine to amplify an acoustic wave by heating the gas in the engine in a forward mode. The engine is coupled to an alternator to convert heat input to the engine into electricity. A plurality of the engines and respective alternators can be coupled to operate in a timed sequence to produce multi-phase electricity without the need for conversion. The engine system may be operated in a reverse mode as a refrigerator/heat pump.

20 Claims, 6 Drawing Sheets

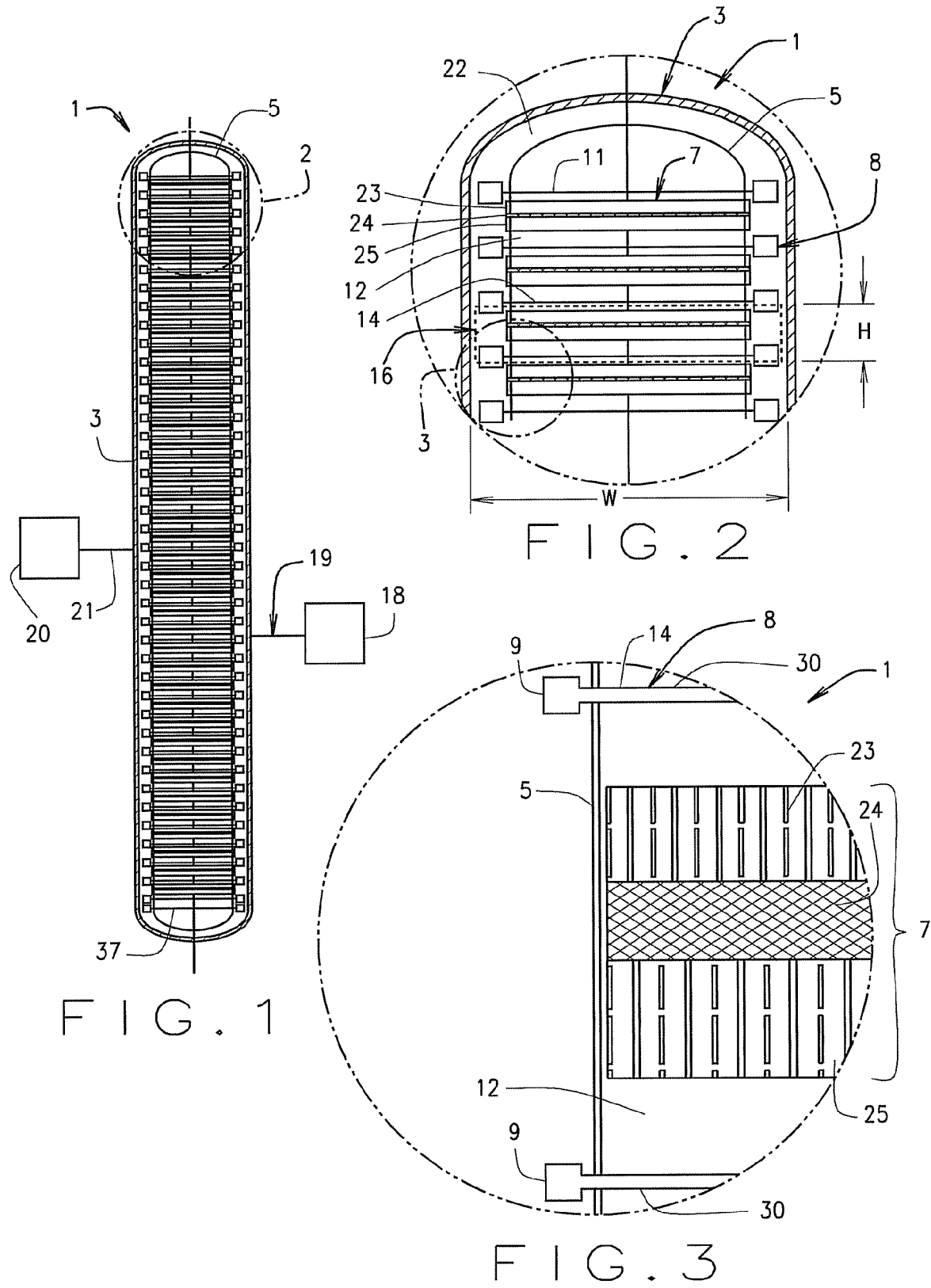

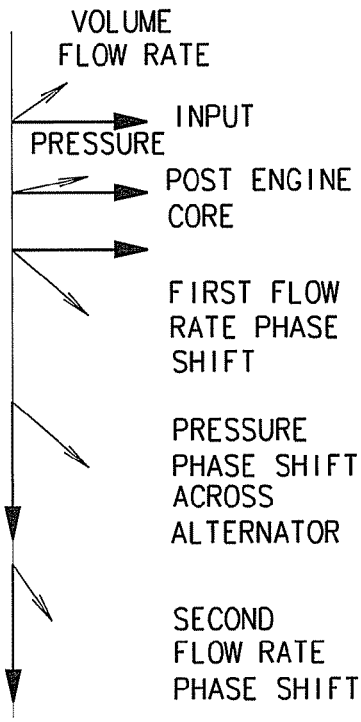
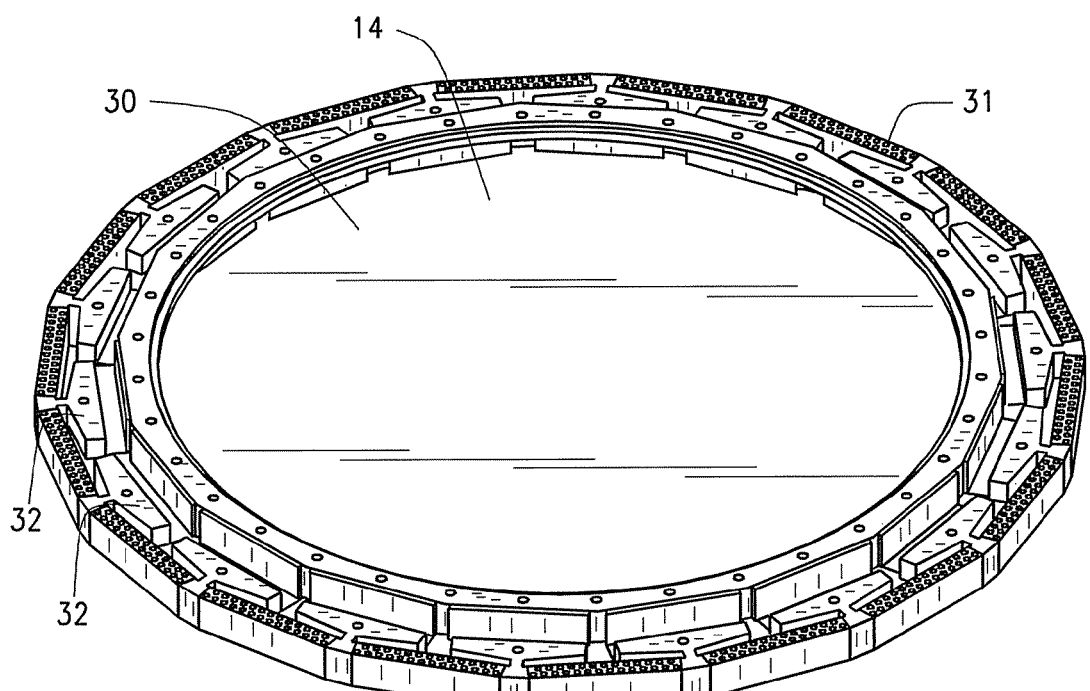
FIG.4
FIG.5

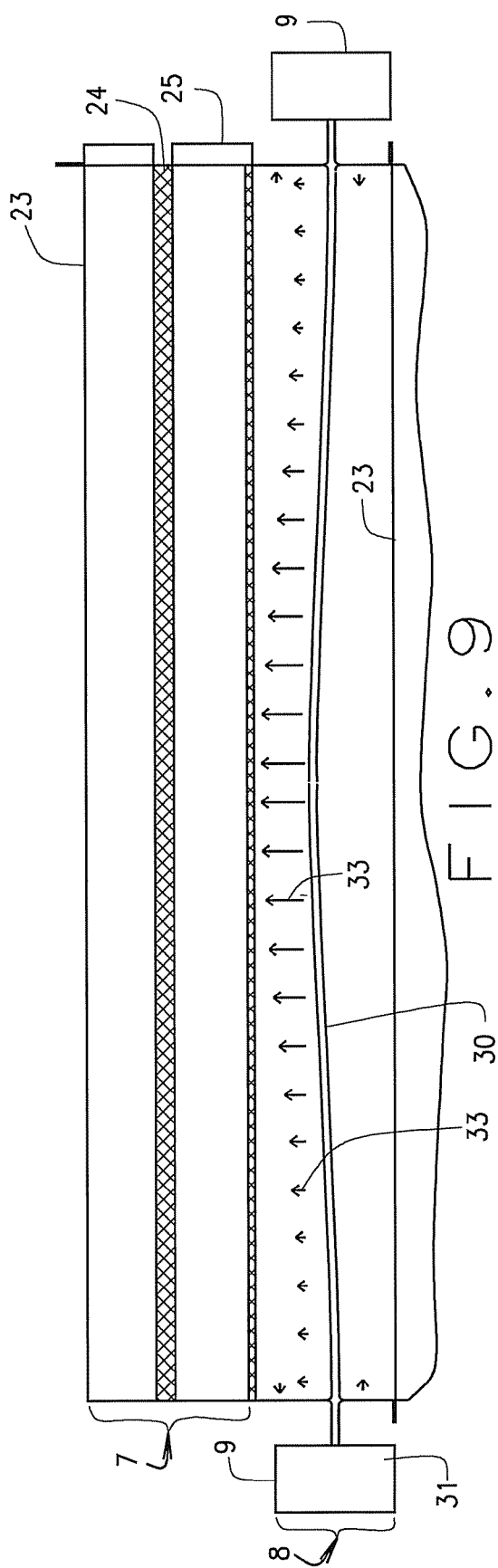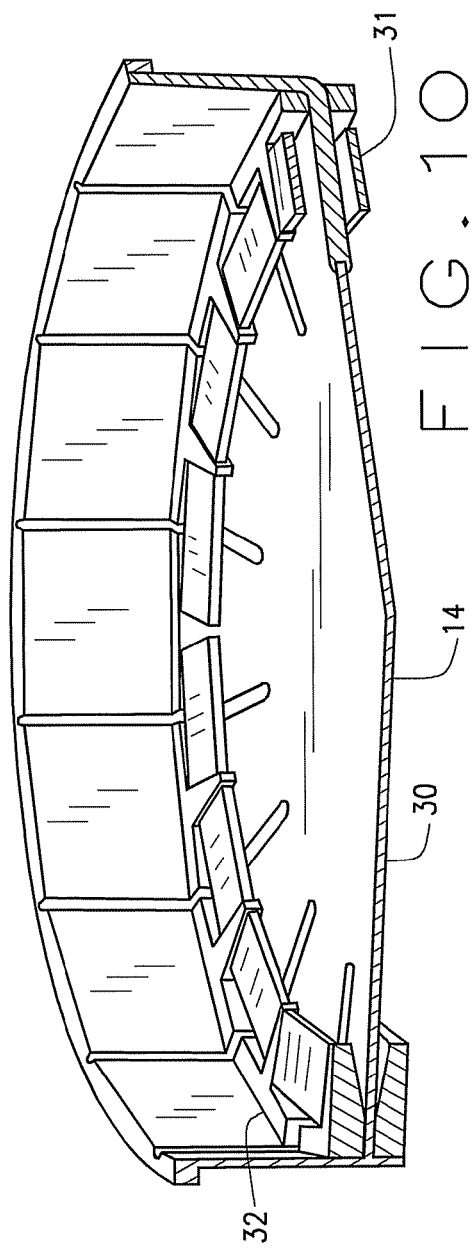

IN-LINE STIRLING ENERGY SYSTEM

STATEMENT REGARDING FEDERAL RIGHTS

This invention was made with government support under contract number DE-AC52-06NA25396 and cooperative agreement DE-FC26-04NT42113 awarded by the U.S. Department of Energy, and grants N00014-03-1-0652 and N00014-07-1-0492 awarded by the U.S. Office of Naval Research. The government has certain rights in the invention.

BACKGROUND OF INVENTION

The generation of electrical energy has long been practiced. Generation can be, for example, by coal-fired or nuclear-powered power plants, typically using steam turbines. Hydroelectric generation using dammed up water, large internal combustion engines driving generators, wind generators, photovoltaic electric generation, portable generators and the like are also used. Chemical reactions may also be used to generate electricity or electric current. Each type of generator has its advantages and disadvantages. For example, steam generation is usually accomplished in very large, very heavy equipment particularly with regard to the generator and the steam turbine that drives the generator. Electrical generation via steam turbines is typically not portable. Internal combustion engines likewise, to be efficient, are also very large and are typically diesel powered and are prone to vibrating. These too are typically not easily portable. There are portable generators that are small but tend to be relatively inefficient. Generators using internal combustion engines are typically limited to a single type of fuel such as diesel fuel, gasoline, gasoline/alcohol mixtures, or propane. Some stationary units use natural gas. Additionally, generator devices typically have a low power output per unit of volume. For example, a portable generator could have an output of less than about 2 kw/ft$^3$ (based on the volume of alternator, engine and drive train)

While such generating systems are effective for producing electric current, they have their drawbacks, some of which were discussed above. Some of the drawbacks have been improved upon by using a Stirling engine to run an alternator forming a generator. An example of a Stirling engine/alternator generator set which utilizes a free piston-style Stirling engine to effect relative movement between magnets and coils in an alternator to generate electricity can be found in the prior art listed in U.S. Pat. No. 6,658,862. A Stirling engine utilizes external combustion to provide the energy to operate the engine and its coupled driven members. Problems associated with a piston-style engine are the friction between the pistons and cylinder walls, leakage of gas through the piston-cylinder wall gaps, the presence of moving mechanical parts at high temperature, and the inability to produce multiphase electricity, for example, three phase electricity, from the generator without additional equipment to convert single phase to multiphase electricity. The benefits of some types of Stirling engines, e.g. free-piston Stirling engines, are their simplicity due to the elimination of or the reduction in the number of moving components while maintaining high efficiency. A typical internal combustion engine is a highly complex mechanical system and has an efficiency of approximately 25% which desirably needs to be improved upon. It would also be desirable to provide a generator system using an external combustion energy source that can utilize a variety of combustible materials as a source of heat energy, or other non-combustion sources of heat energy such as geothermal energy, as opposed to specific fuel requirements for an internal combustion engine. However, to date, attempts at using Stirling engines for the production of electricity have not been successful particularly when it is desired to generate multiphase electric current without conversion.

Another problem with the use of internal combustion engines used in portable generators or fixed generators is that they have a tendency to vibrate and produce noise, both at the exhaust and in their normal vibrations from moving parts. As mentioned above, such engines are fuel specific, mechanically complex, and they have a significant amount of friction associated with their moving components resulting in inefficiencies.

It would thus be desirable, to provide a vibrationally-balanced Stirling energy conversion system that can be used to generate electric current utilizing external combustion or other external energy sources to provide a source of thermal energy. It would also be desirable to provide an electric current generator system that utilizes a Stirling engine to provide the motive driving energy for an alternator, and that the generator system be configured for multiphase electric current output without the need for conversion equipment. Alternatively, the system may be operated in reverse to function as a refrigerator or heat pump.

SUMMARY OF INVENTION

The present invention involves the provision of the combination of a Stirling core with a thermal buffer tube and driven member forming an energy conversion segment. A Stirling core includes a pair of heat exchangers, preferably in combination with a heat transfer device, and a regenerator. There are a plurality of energy conversion segments operably coupled together to provide the Stirling energy conversion system. The various Stirling cores each cooperate with a thermal buffer tube and a driven member to operate in a timed sequence relative to one another so that operating forces are balanced to reduce vibration. In one embodiment of the Stirling energy conversion system, the system may be used to generate electricity and while in another configuration and operating mode, the energy conversion system can be used to operate as a refrigerator or heat pump. When operating as a electricity generator, the driven members are coupled to transducing elements forming an alternator to convert the mechanical motion of the driven member into electrical energy. When operating as a refrigerator or a heat pump, the transducing elements and driven members are operated in reverse as a compressor that converts electrical energy into mechanical motion of the driven member. If mechanical-to-electrical or electrical-to-mechanical transduction is not required in a certain energy conversion segment, the driven member may be passive but still used to create the relative timing between adjacent energy conversion segments.

The present invention involves the provision of an electric current generator that utilizes two or more energy conversion segments whose driven members are coupled to transducing elements to form a generator (or generator set). Preferably, the generating system is configured to produce multi-phase current of a desired number of phases naturally without conversion. Also, in a preferred embodiment, a Stirling engine uses a non-piston drive system to operate its respective alternator. In an additional preferred embodiment, the electric current generating system will operate at a power density output of at least about 20 kw/ft$^3$. The invention also involves the provision of a method of generating multiphase electric current utilizing a plurality of energy conversion segments coupled together in a single energy conversion system. When operated in the reverse sense, the energy conversion system can be used as a refrigerator or heat pump.

BRIEF DESCRIPTION OF DRAWINGS

FIG. 1 is a side elevation sectional schematic view of one form of the present invention.

FIG. 2 is an enlarged fragmentary view of one portion of the energy conversion system seen in FIG. 1.

FIG. 3 is a further enlarged fragmentary view of a portion of the energy conversion system seen in FIG. 2.

FIG. 4 is a phasor diagram of the operation of one form of the present invention. The acoustic pressure phasor is denoted by filled in arrowheads, and the acoustic volume flow rate phasor is denoted by open arrowheads.

FIG. 5 is a perspective view of one form of alternator used in the system of FIG. 1.

FIG. 9 is an enlarged fragmentary side sectional view of one energy conversion segment.

FIG. 10 is an enlarged fragmentary perspective view of an alternate alternator.

Like numbers throughout the various Figures designate like or similar parts and/or construction as described herein.

DETAILED DESCRIPTION

Figure 6:
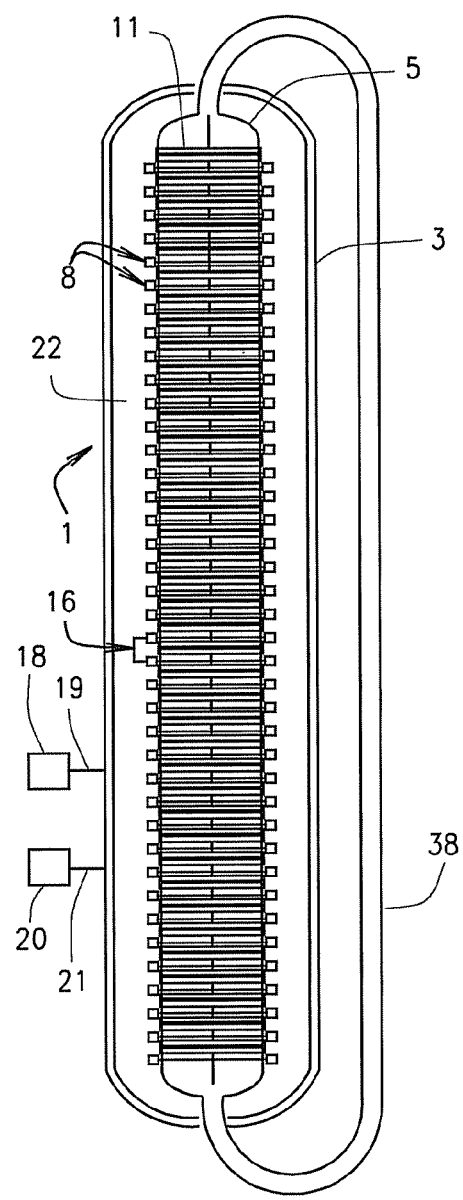
FIG. 6 is a side elevation schematic view of a first alternative embodiment of the present invention.

FIG. 1 illustrates one embodiment of the present invention. The reference numeral 1 designates generally a Stirling energy conversion system comprising an external pressure vessel or housing 3. Inside the pressure vessel 3 is an acoustic shell 5 containing a plurality of Stirling energy conversion segments each designated generally 16 shown being encompassed in broken lines in FIG. 2. Each energy conversion segment 16 consists of a Stirling core 7, a thermal buffer tube 12, and a driven member 14. The driven member 14 is coupled to a transducing element 9 thus forming an alternator 8 that convert the mechanical motion of the driven member into electrical energy. An alternator operating in reverse is used as a launching or starting compressor 11 which initiates the propagation of an acoustic wave at the desired frequency through the various Stirling energy conversion segments 16. The Stirling cores 7 preferably operate at a frequency in the range of between about 40 Hz and about 1000 Hz. Between each Stirling core 7 and respective alternator 8 is a thermal buffer tube 12 to thermally isolate driven member 14 from the respective Stirling core 7.

The Stirling energy conversion system 1 as described herein can be used to generate an energy output from an energy input, for example, to generate an electric current from a thermal input. The Stirling energy conversion system 1 may be also operated in reverse by providing an energy input, say in the form of an electric current, to operate the system 1 as a refrigerator or heat pump. In common with both forms of operation, is the use of a plurality of Stirling energy conversion segments 16 each having a Stirling core 7, a thermal buffer tube 12, and a driven member 14. The Stirling core consists of a regenerator 24, an acceptor heat exchanger 25, and a rejector heat exchanger 23. The first embodiment described below will be a Stirling energy conversion system operating as an electrical current generator and the second embodiment will be that for operating the Stirling energy conversion system in "reverse" function, for example, as a refrigerator or heat pump. The construction of the apparatus is substantially the same whether operated in a "forward" mode or in a "reverse" mode.

Stirling cores 7 are provided heat energy from an external combustion or energy source 18 (shown schematically in FIGS. 1, 6, 7, 11, 12) which may be any suitable energy source, for example, a gas burner (e.g., propane), a trash incinerator, fuel oil or the like. Other sources of heat, such as geothermal, solar power, waste heat, nuclear power, or radioactive decay, may also be used. The energy supply 18 preferably is operable to heat a heat exchange medium, for example water, which is conveyed to the various Stirling cores 7 through a piping system designated generally 19 (shown schematically in FIGS. 1, 6, 7, 11, 12).

The pressure vessel 3 contains pressurized fluid, for example a gas such as helium, at a pressure in excess of about 15 psia (absolute pressure) and preferably in the range of between about 200 psia and about 2000 psia. The pressurized fluid is contained throughout the pressure vessel 3 including inside the acoustic shell 5. Because the pressure is substantially equal on opposite sides of the acoustic shell 5, the acoustic shell can be a thin walled vessel. The space 22 between the pressure vessel 3 and the acoustic shell 5 may be filled with a thermal insulating material with interstitial space to permit pressurized fluid to be contained therewithin. Such thermal insulation can be a fibrous type thermal insulation to reduce heat loss from the acoustic shell to the exterior of the pressure vessel 3. The pressure vessel 3 and the acoustic shell 5 can be made out of any suitable material. For example, the pressure vessel may be made from mild steel and the acoustic shell may be made from stainless steel. The Stirling core 7, thermal buffer tube 12, and alternator 8 are preferably arranged in a straight line sharing a common central axis and are contained within the acoustic shell 5 as seen in FIG. 1. The Stirling energy conversion segments 16 formed by these components are preferably configured in a linear array, i.e., one segment superimposed upon an adjacent segment and sharing a common central axis.

Figure 8:
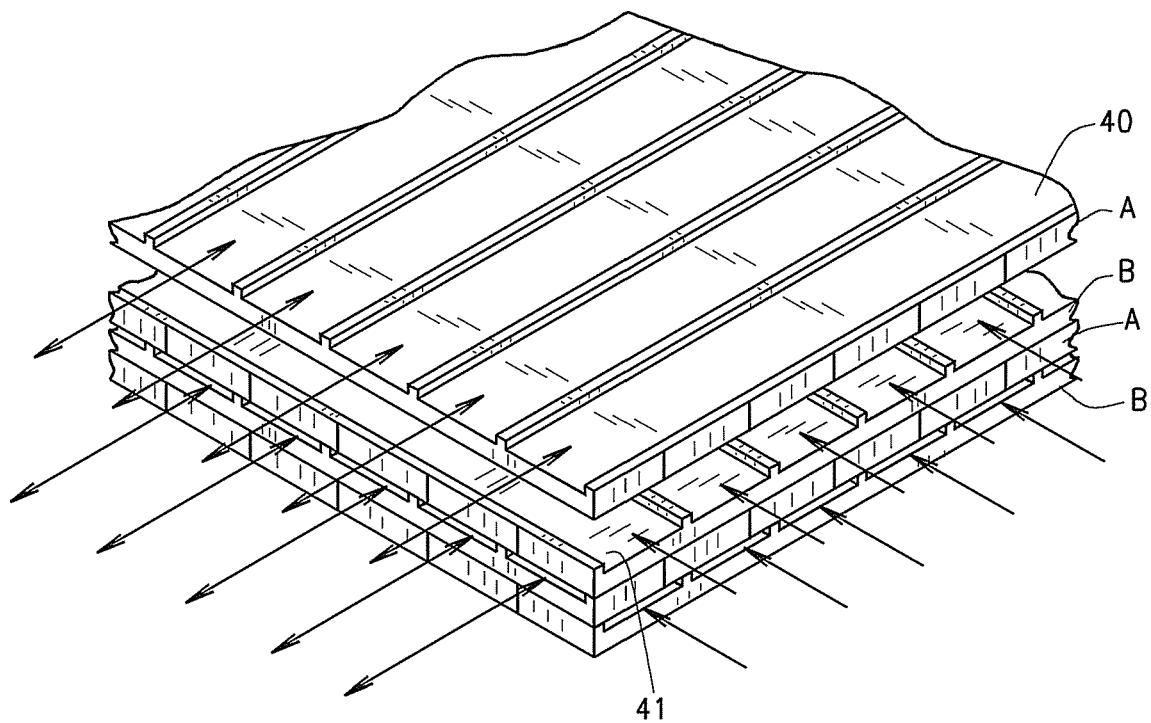
FIG. 8 is an enlarged fragmentary perspective view of a heat exchanger.
Figure 11:
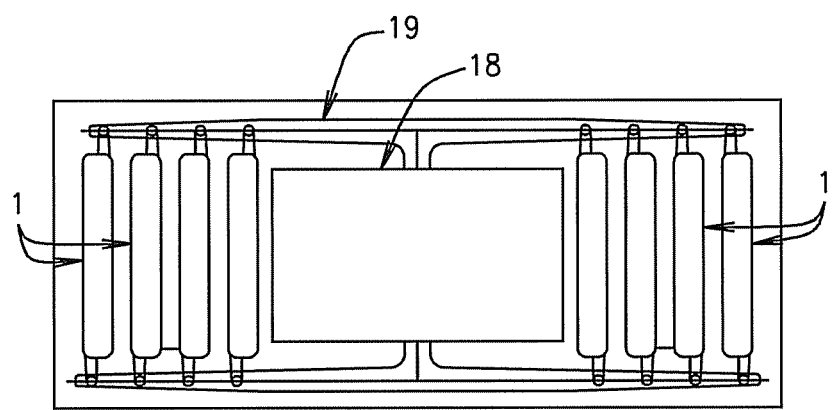
FIG. 11 is a schematic view of a series of generator systems connected together.

A Stirling core 7, in the illustrated structure, includes a rejector heat exchanger 23 positioned in overlying relationship to a respective regenerator 24 which are both in turn in overlying relationship to an acceptor heat exchanger 25 having generally parallel transverse central planes. The regenerator 24 may be a stack of woven wire screens, or other suitable material, that provides for intimate contact between the fluid contained within an energy conversion segment 16 and the regenerator 24. A woven metal wire screen has been used successfully in such engines. On opposite sides of the regenerator 24 are the heat exchangers 23, 25. The rejector heat exchanger 23 transfers heat to a heat sink 20 through a heat transfer medium conveyed by piping system 21. The acceptor heat exchanger 25 absorbs heat from heat source 18 through a heat transfer medium conveyed by piping 19. Preferably, the cooler of heat exchangers 23 and 25 is positioned above the regenerator 24 and the warmer is positioned below the regenerator in each Stirling energy conversion segment 16. Further, the linear array of Stirling energy conversion segments 16 is a preferably vertically oriented array where the central axis of each of the Stirling core 7 is generally vertical. The heat exchangers 23, 25 may be similar in construction and may be made from a stack of photochemically etched stainless steel sheets that are diffusion bonded together. The sheets may be on the order of about 0.030 inches thick and each heat exchanger may contain approximately 500 sheets. A first set of sheets A is etched from one side to form the flow channels for the gas contained within the Stirling energy conversion segments 16 while a similar process may be performed on a second set of sheets B to form channels for conducting flow of heat exchange medium, for example, water (FIG. 8). The sheets A, B are alternately stacked and diffusion bonded together forming a hermetic seal between the channels in sheet A and the channels in sheet B and to the outside of the heat exchangers. Feed and drain systems, which are part of piping systems 19 and 21, may be provided outside the acoustic shell for the flow of heat exchange mediums to the respective heat exchangers. The frequency of operation is inversely affected by the height H of a Stirling energy conversion segment 16, and power is directly affected by the area of a conversion segment through its width W. Additionally, the higher the operating frequency, the shorter the height H and the smaller the volume that a Stirling energy conversion segment 16 needs to occupy to operate. The width W of a conversion segment 16 may be on the order of 2 to 24 inches depending on generator power capacity, while the height H may be on the order of 1 to 12 inches depending on generator frequency. In a preferred embodiment, the transverse cross-sectional shape of the acoustic shell 5 is generally round while the shape of the acoustic shell is generally cylindrical wherein the width W is the diameter of the shell 5. The sheets comprising the heat exchangers may be rectangular providing space between the interior of the acoustic shell 5 and the Stirling core 7 for fluid (heat exchange medium) flow conduits 19 and 21.

Each Stirling energy conversion segment 16 has an alternator 8 comprised of a driven member 14 and a respective transducing element 9 coupled thereto. The alternator 8 is operable to convert energy input from an Stirling core 7 in the form of acoustic work into an electric current output in forward operation. Any suitable alternator 8 may be used and may include a combination of coils and magnets or the like. For purposes of generating electricity, an alternator 8 is any device that converts work output of an Stirling core 7 to electricity. A preferred alternator is a piezoelectric alternator. A preferred piezoelectric alternator is disclosed in co-pending U.S. patent application Ser. No. 11/492,311, US Publication No. 2007/0090723, the entire disclosure of which is incorporated herein by reference. As best seen in FIGS. 5, 10, the alternator 8 includes a plurality of individual piezoelectric elements 31 coupled to a flexible diaphragm 30. The driven member 14 includes a diaphragm 30 as described above. A series of pressure waves such as cyclic acoustic waves flex the diaphragm 30 causing the piezoelectric elements 31 to generate electric current. Each acoustic pressure oscillation generated by a cycle of a Stirling core 7 applies force to a diaphragm 30 which then oscillates along the central axis of the acoustic shell 5 and the central axis of a Stirling core 7 (see FIG. 9). When the diaphragm 30 moves away from its equilibrium position, a radial tension is generated that pulls in on the piezoelectric elements 31 around the perimeter of the alternator 8. The radial tension is converted into compression applied through the piezoelectric elements 31 between keystones 32. The diaphragm 30 oscillates to both sides of its equilibrium position with both excursions resulting in compression of the piezoelectric elements 31 associated therewith. This results in a doubling of the electrical frequency relative to the acoustic frequency provided by the Stirling cores 7. The arrows 33 (FIG. 9) show a representative deflection distribution of a diaphragm 30. Each displacement of the diaphragm 30 in alternator 8 results in a fixed amount of electrical energy being generated. A higher operating frequency of a diaphragm 30 results in a larger amount of electrical energy being produced per unit time and a correspondingly shorter, lower mass, more power dense generator. An alternate to the diaphragm 30 form of generator is the use of magnets and coils which may be coupled to a respective Stirling core 7, for example, through a piston or through a diaphragm.

An acoustic wave launching compressor 11 is provided at the top end of the apparatus 1. The wave launching mechanism is operable to produce acoustic pressure waves at a desired frequency, for example, 400 Hz. These pressure waves are then amplified by each of the Stirling cores 7 producing a response in each of the driven members for example, the diaphragms 30. The Stirling cores 7 each amplify a wave passing through its respective regenerator 24 with the amplification being effected by energy supplied from a heated medium flowing through the acceptor exchanger 25 associated with a respective Stirling core 7. By way of example, if an acoustic wave carrying 100 watts travels through regenerator 24 whose respective acceptor heat exchanger 25 absolute temperature is three times higher than the respective rejector heat exchanger 23 absolute temperature, the power carried by the wave can be amplified to approximately 300 watts prior to it impinging on a respective alternator diaphragm 30. Two hundred watts of power would be extracted by the diaphragm 30 and respective piezoelectric elements 31 leaving 100 watts of power to activate the succeeding Stirling energy conversion segment 16 and so down the array of conversion segments 16 until the wave reaches the bottom conversion segment 16. At this point, one or more terminating alternators 37, with suitable gaps between and following them, are used to extract the remaining acoustic energy, convert this energy to electrical energy, and provide the necessary acoustic termination to prevent reflection of the acoustic wave back through the array of Stirling energy conversion segments 16. In the preferred embodiment, the electrical energy extracted by these terminating alternators 37 is used to power the launching compressor 11. This example does not include losses due to thermal and viscous effects in the gas, but shows the operating principle. In one form of acoustic wave launching mechanism 11, an alternator 8 as described above may be used but operated in reverse i.e., the piezoelectric elements 31 energized to force the diaphragm 30 to vibrate i.e., pulse up and down (back and forth).

Acoustic feedback could be used to provide the initial acoustic wave instead of the launching compressor 11. In this embodiment, the launching compressor 11, one or more of the terminating alternators 37, and the electrical connection between them is removed and replaced by a pipe 38 (FIG. 6) that is approximately one wavelength long or integer multiples of wavelengths long (e.g. one wavelength, two wavelengths, three wavelengths . . . ) at the operating frequency of the generator and the temperature of the gas in the pipe 38. Deviations from integer multiples of a wavelength will be small and are due to dissipation of acoustic energy in the pipe 38. By way of example, if helium is the fluid contained within the acoustic shell 5 and the pressure vessel 3, and the generator 1 is to be operated at a frequency of 400 Hz then the one wavelength long pipe would be 2.56 meters at a temperature of 30° C. The diameter or the cross-sectional area of the pipe 38 may need to be selected in order to minimize dissipation losses in the pipe.

Figure 7:
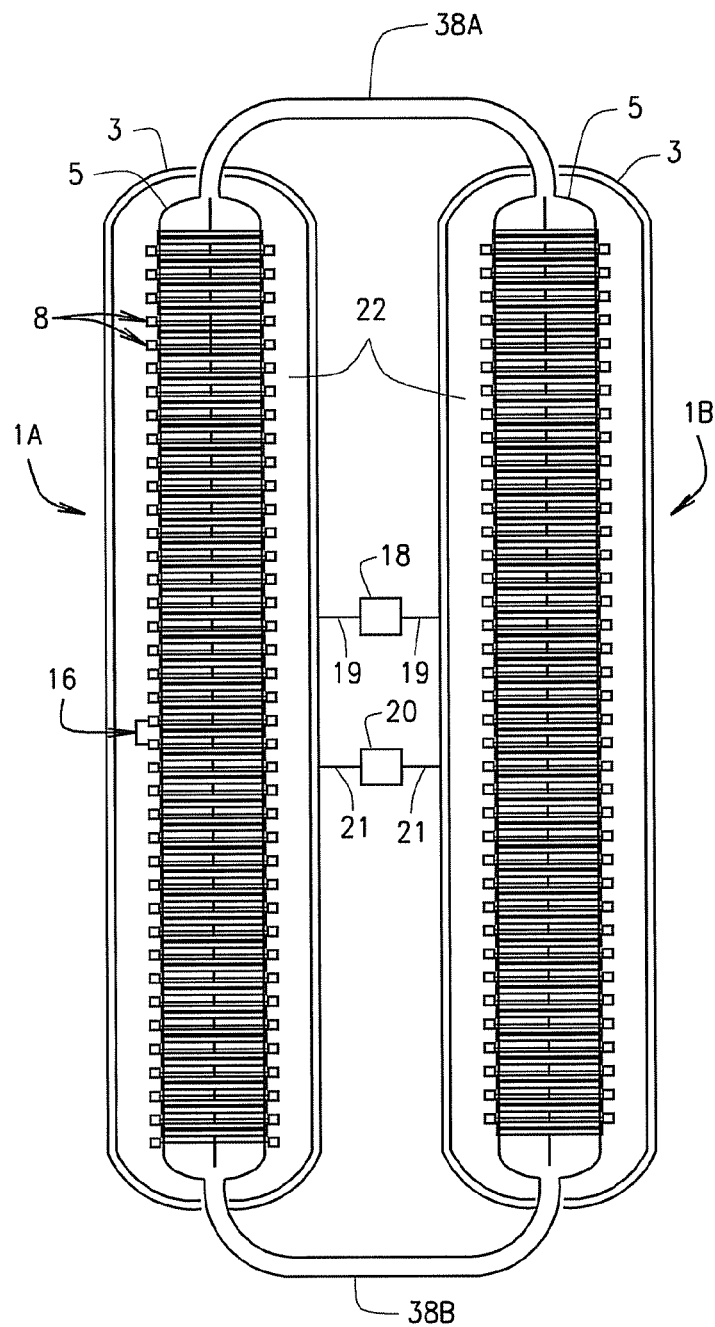
FIG. 7 is a side elevation schematic view of a second alternative embodiment of the present invention.

FIG. 7 shows a second feedback arrangement for a generator 1 which utilizes two generator sections designated 1A, 1B for clarity, which would operate in parallel and be synchronized in operation to one another via two connecting pipes 38A and 38B. These pipes have a length of ½ wavelength or multiples thereof depending on the phase for operation between the two generators sections 1A, 1B. To run 180° out of phase between the two generators, the pipes would be ½, 1½ (3/2), 2½ (5/2), 3½ (7/2) . . . , wavelengths long. To run the two generator sections in phase, the pipes would be 1, 2, 3 . . . wavelengths long. In the embodiments in FIGS. 6 and 7, the elimination of the terminating alternator 37 yields an acoustic wave with residual acoustic energy that is fed back through pipe(s) 38 (38A and 38B) to the input at the initiating end of the linear arrays 1 (1A and 1B) of Stirling energy conversion segments 16. This input acoustic wave allows for the elimination of the launching compressor 11.

The above described generator 1 has been modeled in a computer using the DeltaE modeling software which is available from Los Alamos National Laboratory. The rejector heat exchanger 23 has optimum helium and water channel widths 40, 41 that depend on operating frequency. According to the DeltaE model of a generator operating at a frequency of 400 Hz and a helium pressure of 1160 psia (absolute pressure), the rejector heat exchanger 23 has optimum helium and water (heat transfer medium) channel widths 40, 41 respectively of 190 micrometers and 156 micrometers respectively. In the acceptor heat exchanger 25, the same DeltaE model predicts the optimum helium and water channel widths 40, 41 respectively are 240 micrometers and 188 micrometers respectively. An optimum helium-side porosity for both the rejector and acceptor heat exchangers 23, 25 respectively is approximately 0.13. It is contemplated that the heat exchangers would be made by a diffusion bonded printed circuit board technique to provide the desired dimensions and layouts. FIG. 8 shows an enlarged fragmentary view of such a heat exchanger wherein the heat exchanger is made from a stack of alternating plates A and B. Both type plates A, B are approximately 0.030 inches thick and can be made of Inconel 625 or other suitable material. The plates may be photochemically etched to produce grooves 0.1 inches wide and 0.0061 inches deep in plate A and 0.0075 inches deep in plate B. The heat exchanger would be made of approximately 250 pairs of plates, and they may be joined by diffusion bonding in a vacuum furnace.

The design of the regenerator 24 is such that the typical pore size is several times smaller than the thermal penetration depth of the gas in the Stirling core 7, for example, helium at the operating frequency. This improves thermal contact between the gas and the regenerator solid. The thermal penetration depth is the distance over which the heat can diffuse through the gas in about one quarter of an acoustic cycle. The thermal penetration depth in the ambient temperature helium at 1160 psia absolute pressure at 400 Hz operating frequency is about 50 µm, and the optimum hydraulic radius in the regenerator 24 is about 15 µm. The porosity for a regenerator 24 for 400 Hz operating engine using helium is on the order of about 0.72.

The gas absorbs and rejects heat via thermal contact with the regenerator 24 forcing the gas to thermally expand and contract at the right times relative to the pressure oscillations caused by the acoustic waves in a Stirling core 7. When properly timed by the intimate thermal contact between the gas in the regenerator 24 and the regenerator solid, these expansions and contractions result in an amplification of the acoustic energy carried by the acoustic wave. This process is indicated by the transition from the first to the second phasor plot in FIG. 4.

Each Stirling energy conversion segment 16 is provided with a thermal buffer tube 12. The purpose of the thermal buffer tube 12 is twofold. The volume of the tube 12 is designed to adjust the phase of the volumetric flow rate phasor at the alternator diaphragm 30 so that it lags the pressure phasor by approximately 45° for a four-phase operating system as shown by the transition from the second to third phasor plot in FIG. 4. This allows the inertial impedance of the diaphragm 30 to rotate the pressure phasor by 90° while maintaining the same pressure amplitude as shown by the transition from the third to fourth phasor plot in FIG. 4. In a three phase generator system, the volume flow rate phasor will be set to 60° and the phase rotation of the pressure would be 120°. The thermal buffer tube 12 also allows the acoustic energy to flow away from the acceptor heat exchanger 25 while limiting heat leakage from the acceptor heat exchanger to alternator 8 due to boundary-layer transport, conduction, and radiation leaks. The thermal buffer tube 12 encompasses the volume inside a Stirling energy conversion segment 16 between the acceptor heat exchanger 25 and the respective diaphragm 30.

In a 400-Hz, four phase configuration of the generator 1, the thermal buffer tube 12 has a height of about 1 inch which is about 7.5 times the peak-to-peak gas displacement in the thermal buffer tube. In more traditional designs, the thermal buffer tube 12 has a length on the order of 3 to 6 times the peak-to-peak displacement. For three phase current, the thermal buffer tube 12 would have a height that is even larger than the 7.5 value above. The longer thermal buffer tube 12 allows for better thermal isolation between the acceptor heat exchanger 25 and the diaphragm 30. The volume contained between diaphragm 30 and the following rejector heat exchanger 23 is selected to provide the appropriate amplitude and phase of the volumetric flow rate phasor so that it is substantially equal to the volume flow rate phasor at the input to the proceeding Stirling energy conversion segment 16, but rotated by a desired phase angle for example 90° for a four phase generator. This is shown by the transition from the fourth to fifth phasor plot in FIG. 4. It is desired that the side wall of the acoustic shell be thick enough to contain the oscillations of the gas therewithin and to allow the diaphragm 30 to properly operate.

The operating frequency of the generating system is substantially self-regulating with the components being tuned to provide the desired operating frequency. By providing a linear array of Stirling energy conversion segments 16 that create an integer number of 360 degree rotations of the pressure and volumetric flow rate phasors, vibration in the generating system 1 will be low. For example, in a three-phase configuration, the number of conversion segments 16 should be 3, 6, 9, and so on to achieve low vibration. In a four phase configuration, the number of conversion segments 16 should be 4, 8, 12, and so on to achieve low vibration.

The electrical power output density of the apparatus 1 is preferably at least about 20 kW/ft³ based on the volume of the pressure vessel 3.

The present invention is better understood by description of the operation thereof.

The pressure vessel 3 is pressurized preferably using helium gas to fill the space outside and inside the acoustic shell 5. The wave launching device 11 initiates a pressure oscillation and thereafter maintains a desired oscillation rate, for example, 400 Hz. Alternatively, the pressure oscillation is initiated by the acoustic wave fed back in pipe 38 (38A or 38B). An acoustic traveling wave is projected into the ambient end of the first (top as shown) Stirling energy conversion segment 16 and then the subsequent conversion segments 16 from the respective upstream adjacent conversion segment 16. The temperature gradient imposed on the regenerator 24 by the heat exchangers 23, 25 amplifies acoustic energy carried by the induced traveling wave. By passing through the regenerator 24, the wave is amplified and energy is put into the wave which is then extracted by a respective alternator 8, e.g., the diaphragm 30 and its associated piezoelectric transduction elements 31. As the wave propagates through the rejector heat exchanger 23 up the temperature gradient in the regenerator 24 and then through the acceptor heat exchanger 25, it rejects waste heat into the ambient coolant stream carried by the piping 21. The wave is amplified by the temperature gradient in the regenerator 24 by the gas absorbing high temperature heat from the hot fluid stream in heat exchanger 25. The acoustics of each of the conversion segments 16 and alternators 8 are designed to rotate the phase of the pressure and volume flow rate phasors by the same amount so that the relative phase between the pressure and flow rate is the same as the input to a second Stirling energy conversion segment 16. The magnitude of the rotation will be determined by the number of phases of electric current that it is desired to be generated naturally within the Stirling energy conversion system 1. Near the bottom of a regenerator 24, the volume flow rate and pressure phasors are nearly in phase which is advantageous from the standpoint of maximum power transmission with minimum viscous loss and acoustically transported heat leaks. The volume flow rate is conserved through the respective alternator diaphragm 30, but the moving mass of the diaphragm generates a pressure drop that lags the volume flow rate by about 90°. By selecting the right diaphragm mass, the magnitude of this pressure drop may be tuned to rotate the pressure phasor by an angle suitable for the number of electrical phases desired. After passing through the entire linear array of Stirling energy conversion segments 16, the acoustic wave is incident on set of terminating alternators 37 that extracts the remaining acoustic power from the wave and prevents reflections of the wave back though the linear array of energy conversion segments 16. The electrical power generated by terminating alternators 37 is used to power the launching compressor 11. Alternatively, feedback pipe 38 (38A and 38B) is used in place of terminating alternators 37 to feed the acoustic wave and its associated acoustic power back to the top of linear array of energy conversion segments 16.

Figure 12:
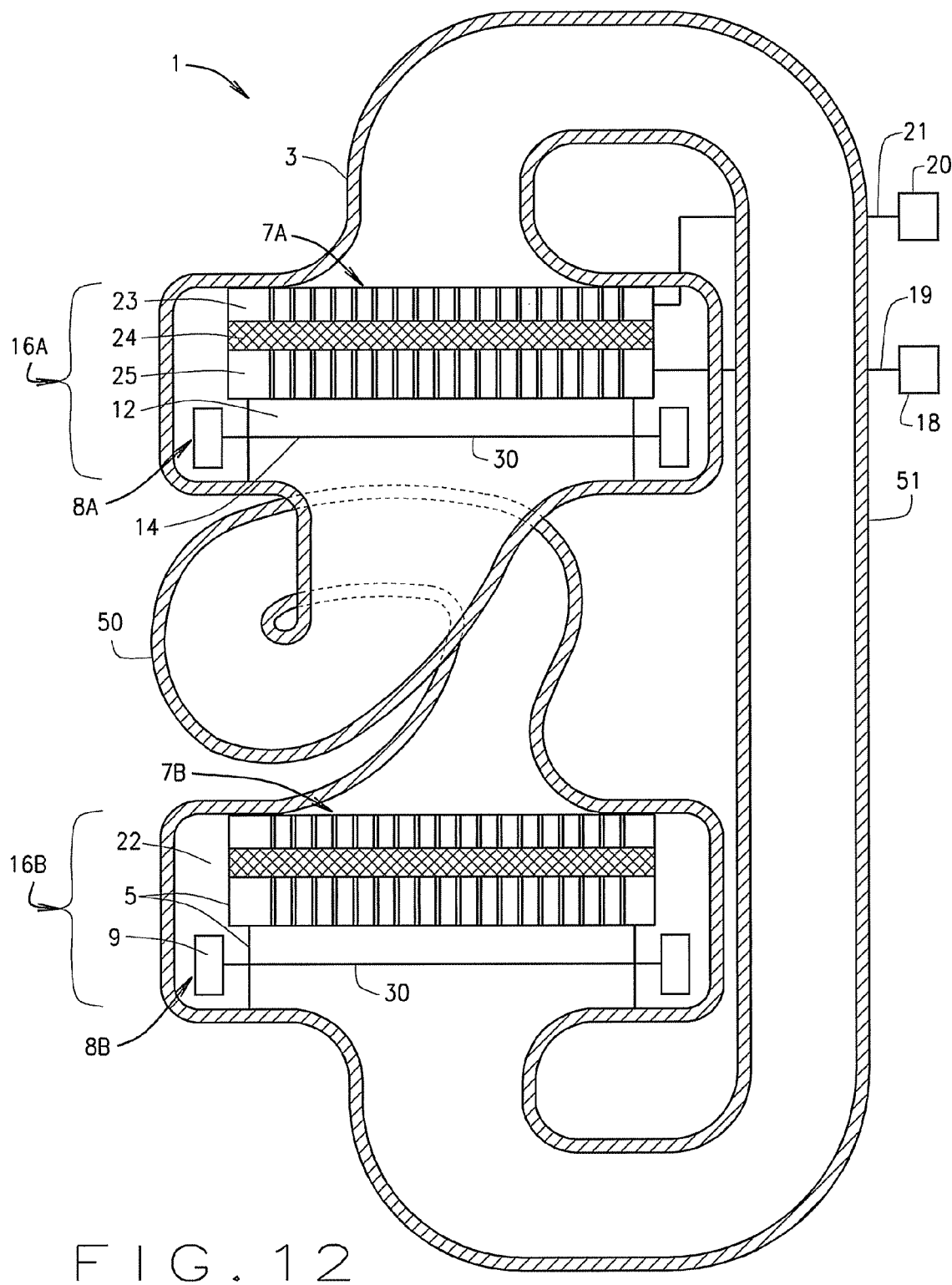
FIG. 12 is a side elevation schematic view of an alternative embodiment of the present invention.

FIG. 12 shows a further alternative embodiment of the present invention, which can be advantageous when the goal is to use the least number of Stirling energy conversion segments 16 while maintaining adequate vibration balance. Two Stirling energy conversion segments 16A and 16B operate approximately 180° out of phase with respect to each other. Acoustic energy leaving the bottom of segment 16A is coupled to the top of segment 16B through waveguide 50 (a pipe or conduit and shown as serpentine in shape). Similarly, acoustic energy leaving the bottom of segment 16B is coupled to the top of segment 16A through waveguide 51 (a pipe or conduit and shown as serpentine in shape). An acoustic wave circulates around the loop composed of conversion segments 16A, 16B and waveguides 50, 51. The geometry of waveguide 50 is designed so that in combination with segment 16A, the acoustic wave goes through a 180° phase shift at the desired operating frequency as it propagates between the top of segment 16A, through waveguide 50, to the top of segment 16B. Similarly, the geometry of waveguide 51 is shaped to cause the circulating acoustic wave to go through 180° of phase shift as it propagates between the top of segment 16B through waveguide 51 to the top of core 16A. Most of the moving mass that contributes to the vibration of the overall generator system 1 is located in diaphragms 30. By arranging the loop to have the two segments 16A and 16B physically in-line and operating 180° out of phase, these principle vibration components can be substantially canceled.

A Stirling engine can also be used in a reverse mode, as a refrigerator or heat pump that accepts mechanical or acoustical work from driven member 14 and pulls in heat energy at a low temperature and rejects heat at a higher temperature rather than as a heat engine that produces mechanical or acoustical work by accepting heat at a high temperature and rejecting heat at a lower temperature. Many electro-acoustic transducers, i.e. driven member 14 in combination with transducing element 9, whether they use combinations of magnets and coils or whether they use piezoelectric elements, can also be used in the reverse sense, able to deliver mechanical or acoustical work from input electrical energy, rather than producing electrical energy from input mechanical or acoustical work. In the reverse sense, the driven member 14 and transducing element 9 function together as a compressor 8 to provide acoustic work input. Thus the Stirling energy conversion system disclosed herein may also be used as a refrigerator or heat pump. The Stirling cores 7 and thermal buffer tube are functionally unchanged, however the regenerator 24 now attenuates the acoustic power in the wave and the temperature of the acceptor heat exchanger 25 is now lower than the temperature of the rejector heat exchanger 23 implying that the conversion system 1 should be oriented opposite with respect to gravity (see FIG. 1) when operated as a refrigerator or heat pump. The alternators 8 are now used as compressors 8 and are used to replace the acoustic power that was removed from the wave by the regenerators 24. Acceptor heat exchangers 25 are connected by piping system 19 to heat source 18, heat source 18 now being cooler than heat sink 20. Acoustical energy flows through the pressurized working fluid contained in acoustic shell 5 in the same direction regardless of whether the Stirling energy conversion system 1 is used as a generator, refrigerator or heat pump. When Stirling energy conversion system 1 is used as a heat pump, operation is much the same as when it is used as a refrigerator, except that the useful output of the system is the heat rejected by heat exchangers 23.

As can be appreciated by those skilled in the art, various acoustical elements may be substituted for the Stirling cores 7, alternators 8, or waveguides 38 and still maintain an integer number of 360 degree rotations of the pressure and volumetric flow rate phasors and thus maintain the vibration balance of the system as a whole. It may also be appreciated that various useful devices may be made by mixing and matching various types of elements in a linear array of Stirling energy conversion segments 16. For example a heat driven device could be made that both generates electricity and refrigeration with appropriate combinations of Stirling cores 7 and alternators 8 in a single system 1. Some elements that may substitute for the acoustic mass of the alternators 8 are constrictions, short tubes, and passive driven members without electrical generating capabilities. Some elements that may be substituted for the compliance of the conversion segments 16 include passive chambers of working fluid, or diaphragms and pistons whose motion is dominated by stiffness restoring forces rather than their mass. Various lengths of waveguides may also be substituted for combination of lumped masses and springs.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A Stirling energy conversion system comprising:
a housing containing a compressible fluid capable of supporting propagation of acoustical traveling waves;
two or more driven members positioned along a common central axis, wherein the driven members oscillate along the common central axis;
the driven members having a first face and an opposed second face, the first face configured to accept acoustic power from the compressible fluid and the second face configured to deliver acoustic power to the compressible fluid;
a plurality of transduction elements each operably coupled to one or more of the driven members, wherein the transduction elements are operable to extract mechanical energy from the one or more driven members and convert the extracted energy to electrical energy, or convert received electrical energy and input mechanical energy into the driven member;
one or more Stirling cores positioned adjacent to and in acoustic communication with at least one driven member, wherein each Stirling core includes a rejector heat exchanger operable to reject heat to an external heat sink, an acceptor heat exchanger operable to absorb heat energy from an external source, and a regenerator, wherein acoustical traveling waves propagate through the rejector heat exchanger, the regenerator and the acceptor heat exchanger; and
means for guiding acoustical waves sequentially through the driven members and the Stirling cores reducing the net vibration of the Stirling energy conversion system.

2. The energy conversion system of claim 1 wherein the driven members include diaphragms.

3. The energy conversion system of claim 1 wherein the transduction elements include piezoelectric elements which are each operably coupled to a respective said driven member.

4. The energy conversion system of claim 1 further comprising an initiating oscillation generator operably coupled to at least one of said Stirling cores to effect operation of the Stirling cores at a predetermined frequency.

5. The energy conversion system of claim 1 wherein the transduction elements each include piezoelectric elements.

6. The energy conversion system of claim 1 wherein the driven members and transduction elements produce multiphase electricity.

7. The energy conversion system of claim 6 wherein the multiphase electricity has three phases.

8. The energy conversion system of claim 6 wherein the number of phases is dependent upon the application.

9. The energy conversion system of claim 1 wherein there are at least three Stirling cores and at least three driven members.

10. The energy conversion system of claim 1 wherein the electricity from each of the transduction elements is phased relative to one another by operation of the Stirling engines.

11. The energy conversion system of claim 1 having an electrical output power density of at least about 20 kw/ft$^3$.

12. The energy conversion system of claim 1 further including:
a housing having a first end and second end and enclosing a plurality of Stirling cores and driven members, wherein acoustical traveling waves propagate from the first end, sequentially though the Stirling cores and driven members, to the second end; and
an acoustic waveguide extending between the second end of the said housing and the first end of the said housing to transfer an acoustic wave output of the second end of the housing to the first end of the housing.

13. The energy conversion system of claim 1 further including:
a pair of housings each having a first end and second end and enclosing a plurality of said Stirling cores and driven members;
a first waveguide extending between a first end of one said housing and a second end of a second said housing; and
a second waveguide extending between a second end of said one housing to a first end of said second housing.

14. A method of producing phased electricity, said method comprising:
operating a plurality of alternators with a plurality of Stirling engines interconnected in a linear array, the electricity output of the alternators being phased relative to one another to produce a combined output current with at least two phases;
positioning two or more driven members along a common central axis, wherein the driven members oscillate along the common central axis;
positioning one or more Stirling cores adjacent to and in acoustic communication with at least one driven member;
guiding acoustical waves sequentially through the driven members and the Stirling cores;
propagating waves substantially in only one direction; and
reducing the net vibration of the system by having the net sum of the oscillatory motions of the driven members at any moment in time equal to near zero.

15. The method of claim 14 wherein the driven members include diaphragms.

16. The method of claim 14 further comprising generating at least 20 kw/ft$^3$ of space occupied by a pressure vessel enclosing the Stirling engines and alternators.

17. The method of claim 14 wherein the alternators include piezoelectric elements to generate electricity.

18. The method of claim 14 wherein the Stirling engines operate at a frequency in the range of between about 40 Hz and about 1,000 Hz.

19. The method of claim 14 wherein the Stirling engines operate at a frequency in the range of between about 10 Hz and about 2,000 Hz.

20. The method of claim 14, wherein the number of phases is dependent upon the application.

* * * * *

UNITED STATES PATENT AND TRADEMARK OFFICE
CERTIFICATE OF CORRECTION

PATENT NO. : 7,908,856 B2
APPLICATION NO. : 11/877816
DATED : March 22, 2011
INVENTOR(S) : Scott N. Backhaus and Robert Keolian Page 1 of 1

It is certified that error appears in the above-identified patent and that said Letters Patent is hereby corrected as shown below:

Title Page, Item (73) Assignee:, please add co-assignee --The Penn State Research Foundation (University Park, PA)--.

Signed and Sealed this
Tenth Day of September, 2013

Teresa Stanek Rea
*Acting Director of the United States Patent and Trademark Office*